(12) United States Patent
Ohmura (10) Patent No.: US 6,963,363 B1
(45) Date of Patent: Nov. 8, 2005

(54) DIGITAL CAMERA CAPABLE OF EMBEDDING AN ELECTRONIC WATERMARK INTO IMAGE DATA

(75) Inventor: Akira Ohmura, Kawasaki (JP)

(73) Assignees: Nikon Corporation, Tokyo (JP); Nikon Technologies Inc., Tokyo (JP)

( * ) Notice: Subject to any disclaimer, the term of this patent is extended or adjusted under 35 U.S.C. 154(b) by 869 days.

(21) Appl. No.: 09/655,917

(22) Filed: Sep. 6, 2000

(30) Foreign Application Priority Data

| Sep. 10, 1999 | (JP) | ................................. 11-256548 |
| Apr. 7, 2000 | (JP) | ............................. 2000-105973 |

(51) Int. Cl.⁷ .......................... H04N 5/76; H04N 11/00; H04N 7/00; G06K 9/00; G06K 9/36
(52) U.S. Cl. ................... 348/231.3; 348/460; 382/100; 382/232
(58) Field of Search ............................. 382/100, 232; 348/207.1, 231.3, 460

(56) References Cited

U.S. PATENT DOCUMENTS

| 5,499,294 | A | * | 3/1996 | Friedman ..................... 713/179 |
| 5,606,609 | A | * | 2/1997 | Houser et al. ............... 713/179 |
| 5,898,779 | A | * | 4/1999 | Squilla et al. .............. 713/176 |
| 6,005,936 | A | * | 12/1999 | Shimizu et al. ............. 713/176 |
| 6,064,764 | A | * | 5/2000 | Bhaskaran et al. .......... 382/183 |
| 6,128,411 | A | * | 10/2000 | Knox .......................... 382/232 |
| 6,137,952 | A | * | 10/2000 | Hogan .......................... 386/94 |
| 6,216,228 | B1 | * | 4/2001 | Chapman et al. ........... 713/176 |
| 6,567,531 | B1 | * | 5/2003 | Kondo et al. ............... 382/100 |
| 6,700,989 | B1 | * | 3/2004 | Itoh et al. ................... 382/100 |

FOREIGN PATENT DOCUMENTS

| JP | A-10-164349 | 6/1998 |
| JP | A-10-248046 | 9/1998 |

* cited by examiner

*Primary Examiner*—Wendy R. Garber
*Assistant Examiner*—Kelly L. Jerabek
(74) *Attorney, Agent, or Firm*—Oliff & Berridge, PLC (57) ABSTRACT

A digital camera has a memory for storing a plurality of programs each to embed a watermark on a digital image data. The digital camera embeds the watermark on the image data according to the program selected by a program selector. In the case of a digital camera capable of selecting whether or not to embed a watermark, the digital camera forcibly controls to embed the watermark if the selection is failed. The digital camera has a processor for processing a digital image data in accordance with one of a plurality of selective data forms, one of the data forms being suitable for a watermark, and another unsuitable. In this case, the digital camera controls the processor to replace the unsuitable data form by the suitable one under the necessity of embedding the watermark on the digital image data.

10 Claims, 11 Drawing Sheets

DIGITAL CAMERA CAPABLE OF EMBEDDING AN ELECTRONIC WATERMARK INTO IMAGE DATA

BACKGROUND OF THE INVENTION

This application is based upon and claims priority of Japanese Patent Applications No. 11-256548 filed on Sep. 10, 1999, and No. 2000-105973 filed on Apr. 7, 2000, the contents being incorporated herein by reference.

1. Field of the Invention

The present invention relates to a digital camera, and more specifically to a digital camera that is capable of embedding an electronic watermark into electronic image data of the digital camera.

2. Description of Related Art

Many publishers and newspaper companies or the like post image data taken by a digital camera on their home pages on the Internet. Since the image data on home pages is electronic image data, it is easy to copy it from the home pages. The image data on home pages is apt to be used or sold without approval of image data's owner, such as a publisher, a newspaper company, or a photographer. Accordingly, publishers and newspaper companies embed electronic watermarks into the electronic image data in order to check whether the image data on their home pages has been used without publisher's or newspaper company's approval.

A technology that embeds an electronic watermark into electronic image data is disclosed in Japanese Laid-open Patent Application No. 10-164349, and a digital camera that embeds the electronic watermark into the image data is disclosed in Japanese Laid-open Patent Application No. 10-248046.

A photographer sometimes contracts a plurality of publishers and newspaper companies. The photographer brings the image data directly to the publishers and newspaper companies or sends the image data to them via a telephone line or the Internet. Since each publisher or newspaper company uses its own embedding program and authentication key with respect to the electronic watermark, it is necessary to embed an unique electronic watermark data corresponding to each publisher or newspaper company. Furthermore, a plurality of photographers sometimes share one digital camera. In this case, it is necessary for each photographer to use its own embedding program and authentication key different from others.

Furthermore, the setting operation of the digital camera for the purpose of embedding the electronic watermark into the digital image is apt to cause a photographer to loose a shutter chance.

Furthermore, each digital camera maker sometimes adopts an original format for storing image data, such as a raw image data storing format. As to the raw image data storing, it is sometimes impossible to embed the electronic watermark into the raw image data using a normal embedding program, although it is possible to embed the electronic watermark into JPEG compression image data or non-compression image data (such as a bitmap image data) using the normal program. Accordingly, when the electronic watermark is embedded into the raw image data, it is necessary to develop an original embedding program for the electronic watermark, and it is costly.

SUMMARY OF THE INVENTION

In order to overcome the problems and disadvantages, the invention provides a digital camera comprising a memory that stores a plurality of programs each to embed a watermark on a digital image data and an embedding circuit that embeds the watermark on the image data according to the program selected by a program selector. This makes it possible to select the watermark needed.

According to another feature of the invention, a digital camera comprises a transmitter that transmits a digital image data to a place remote from the camera and a controller that inhibits the transmitter from transmitting the digital image data on which the watermark is failed to be embedded.

According to still another feature of the invention, a digital camera comprises a controller that controls a embedding circuit to surely embed the watermark on a digital image data on which the watermark is failed to be embedded. This feature makes it possible to avoid the watermark being failed to be embedded.

According to a further feature of the invention, a digital camera comprises an embedding circuit that embeds a watermark on a digital image data and a controller that gives a warning if a watermark is failed to be embedded. This feature makes it possible to avoid the watermark being failed to be embedded.

According to a still further feature of the invention, a digital camera comprises a processor that gets a first and second picture image data on the basis of a same digital image data from the imaging device and an embedding circuit that embeds the watermark on one of the first and second picture image data with the other kept without the watermark.

According to another feature of the invention, a digital camera comprises a setting circuit that sets whether or not to have an embedding circuit embed a watermark and a controller that forcibly controls the embedding circuit to embed the watermark if the setting by the setting circuit is failed. This feature makes it possible to avoid the watermark being failed to be embedded.

More specifically, the invention further provides a digital camera comprising a processor that processes a digital image data in accordance with one of a plurality of selective data forms, one of the data forms being suitable for a watermark, and another unsuitable. The digital camera further comprises a controller that controls the processor to replace the unsuitable data form by the suitable one under the necessity of embedding the watermark on the digital image data.

Or, the invention provides a digital camera comprising a processor that processes a digital image data in accordance with one of a plurality of selective data forms, one of the data forms being suitable for a watermark, and another unsuitable. The digital camera further comprises a controller that gives a warning if the processor is to process the digital image data in accordance with the unsuitable data form under the necessity of embedding the watermark on the digital image data.

Other features and advantages according to the invention will be readily understood from the detailed description of the preferred embodiments in conjunction with the accompanying drawings.

DETAILED DESCRIPTION OF THE PREFERRED EMBODIMENTS

Figure 1:
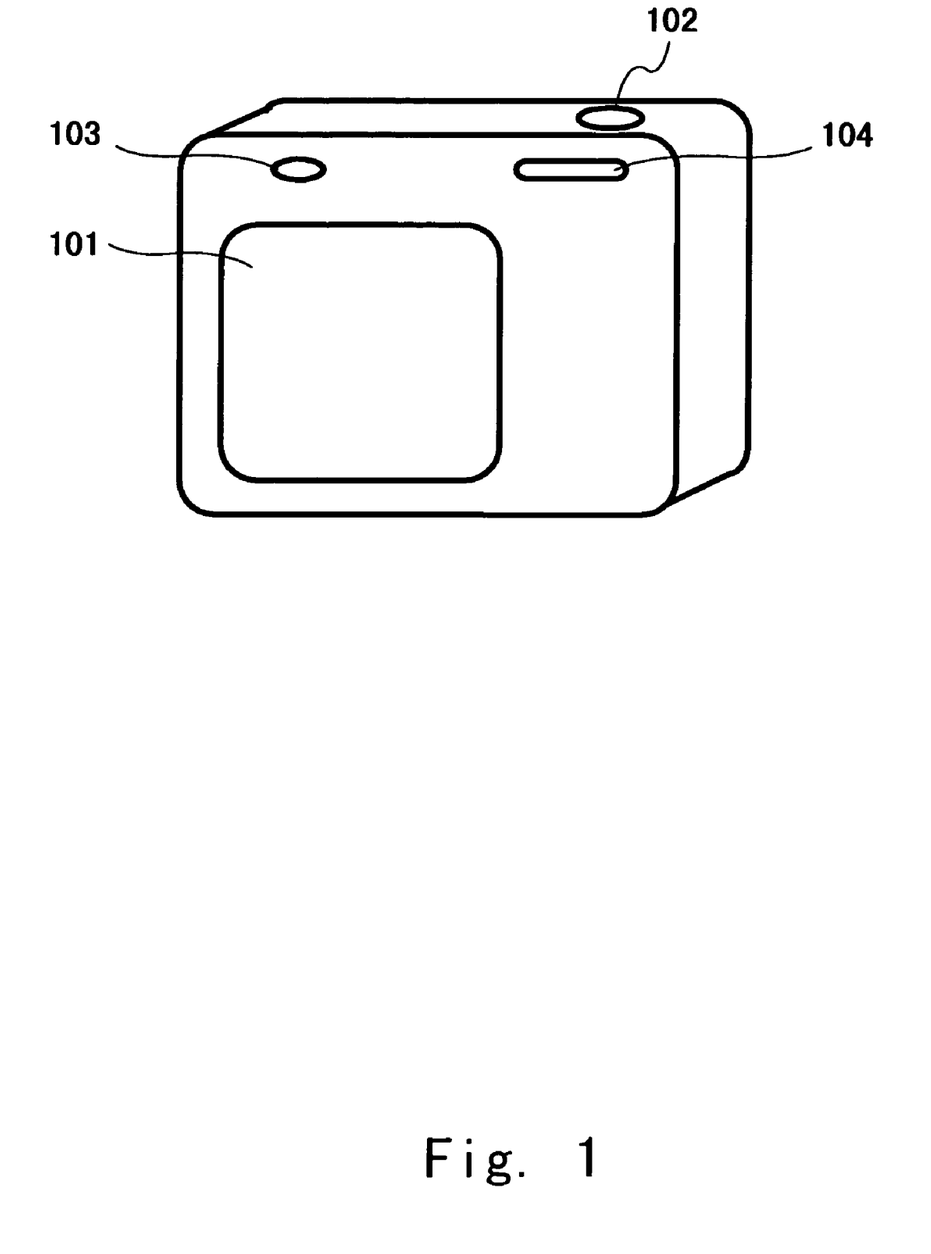
FIG. 1 is an external view of a digital camera according to embodiments of the present invention.

FIG. 1 is an external view of the digital camera according to the first embodiment of the present invention. The digital camera comprises LCD display 101, shutter-release button 102, menu button 103 and setting dial 104.

LCD display 101 includes a liquid crystal device for displaying an image of an object to be taken or a reproduced image. LCD display 101 also displays menu screens that are used in various settings. Shutter-release button 102 starts the process of taking a picture. Menu button 103 and setting dial 104 perform various settings. Menu button 103 is for causing a display of a menu screen on LCD display 101. Dial 104 enables settings for various kinds of photographing control and image processing control.

Figure 2:
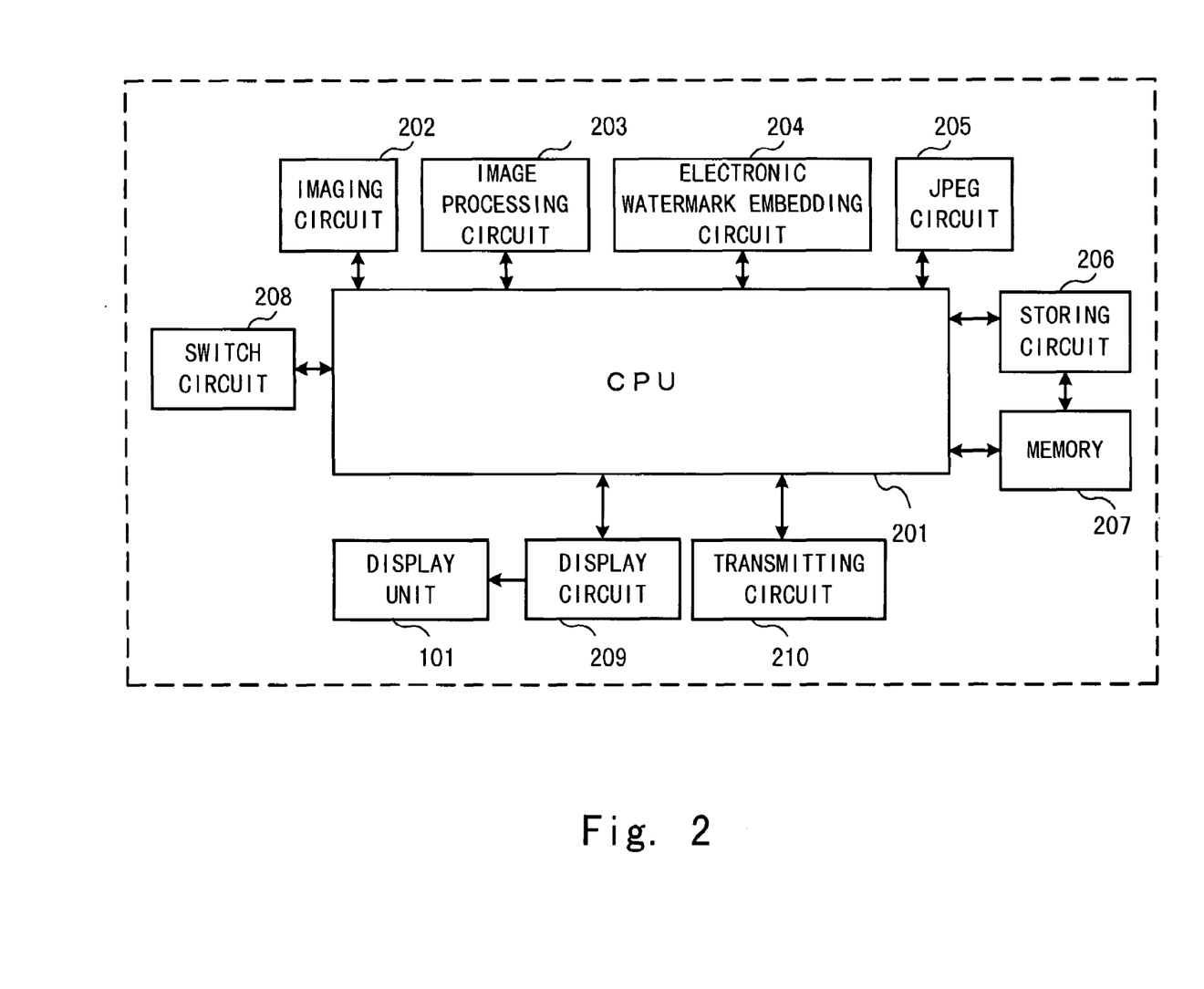
FIG. 2 is a block diagram illustrating the function of the digital camera according to embodiments of the present invention

FIG. 2 is a block diagram illustrating the function of the digital camera according to embodiments of the present invention. CPU 201 controls other circuits to take a picture and store the image data. Imaging circuit 202 includes an imaging device and an A/D converter, and outputs an image signal of a photographed object. Image processing circuit 203 processes the signal output from imaging circuit 202 in various manner to output the image data. Embedding circuit 204 embeds electronic watermark data into the image data that is output from image processing circuit 203. JPEG circuit 205 JPEG-compresses the image data output from image processing circuit 203 or the embedding circuit 204. JPEG circuit 205 on the other hand expands the compressed image data stored in memory 207.

Storing circuit 206 stores the image data into memory 207 and reads out the image data stored in memory 207. Storing circuit 206 also stores the image data into a memory card (not shown) which is detachable from the digital camera, and reads out the image data stored in the memory card. Memory 207 is a nonvolatile memory that stores the image data. Memory 207 also stores a control program for controlling the digital camera and a plurality of embedding programs each to embed a electronic watermark into the image data. Furthermore, memory 207 stores necessary information for identifying destination companies such as publishers and newspaper companies, as well as information for identifying the kind of electronic watermark that is used by each of the destination companies. Memory 207 also stores folder information that is used to classify the image data, and stores electronic watermark information that is assigned to each folder. Switch circuit 208 is electrically connected to shutter-release button 102, menu button 103 and dial 104. When any of these buttons is operated, switch circuit 208 detects the operation of the button to transmit a signal to CPU 201. Display circuit 209 drives LCD display 101 in order to display images on the screen. Transmitting circuit 210 transmits image data to a selected destination.

Furthermore, the digital camera can set durability of the electronic watermark. If the durability is set at high level for the electronic watermark, the electronic watermark remains against any edition, such as copying, changing the size and cutting, so that it is valid for protecting copyright. If the durability is set at low level, on the contrary, even a slight edition causes a change in the electronic watermark, so that it is valid for proving that the image has been tampered.

Furthermore, the digital camera according to the present invention has a plurality of watermark embedding programs, one of which is selectable in accordance with a specific need.

The digital camera according to the invention can select one of a plurality of authentication keys and embed it into the image data by using the above-mentioned program. This is advantageous for a photographer who contracts with a plurality of publishers and newspaper companies in that it is possible to select a desired one of authentication keys in accordance with the publisher or newspaper company.

The following explains functions performed in a CPU 201 of the digital camera in accordance with the first embodiment of the present invention.

The First Embodiment

When the image data is to be transmitted to a destination, the digital camera determines whether or not electronic watermark data should be embedded into the image data. If the electronic watermark data should be embedded for the destination, then it is checked whether or not the electronic watermark data has been embedded into the image data. If the electronic watermark data has not been embedded into the image data, then the corresponding electronic watermark data is embedded into the image data. Embedding the corresponding electronic watermark data is possible by designating only the destination according to a database in which each destination corresponds to destination's electronic watermark data and each user of the electronic watermark data corresponds to user's electronic watermark data, in memory 207. If the electronic watermark data has been embedded, and the embedded watermark data does not correspond to the destination's watermark data, then the embedded electronic watermark data is replaced to the destination's electronic watermark data.

Figure 3:
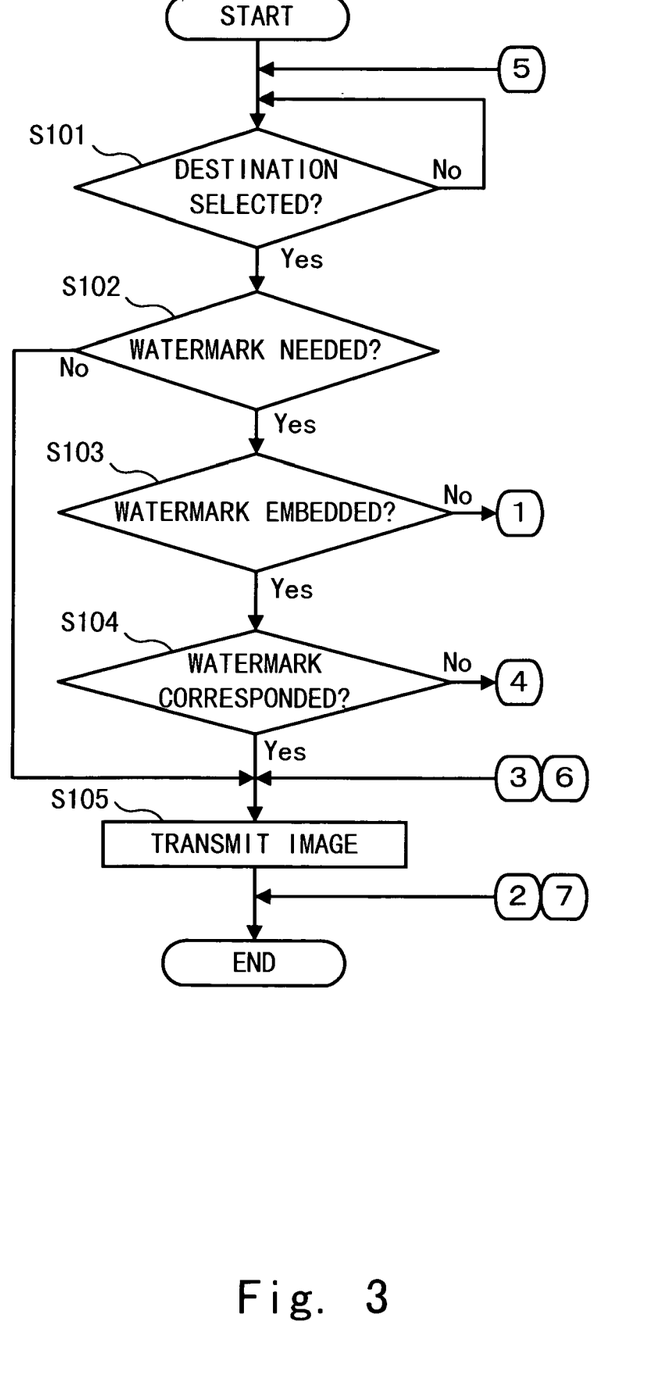
FIG. 3 is a flowchart illustrating the control for transmitting image data in accordance with the first embodiment of the present invention.
Figure 4:
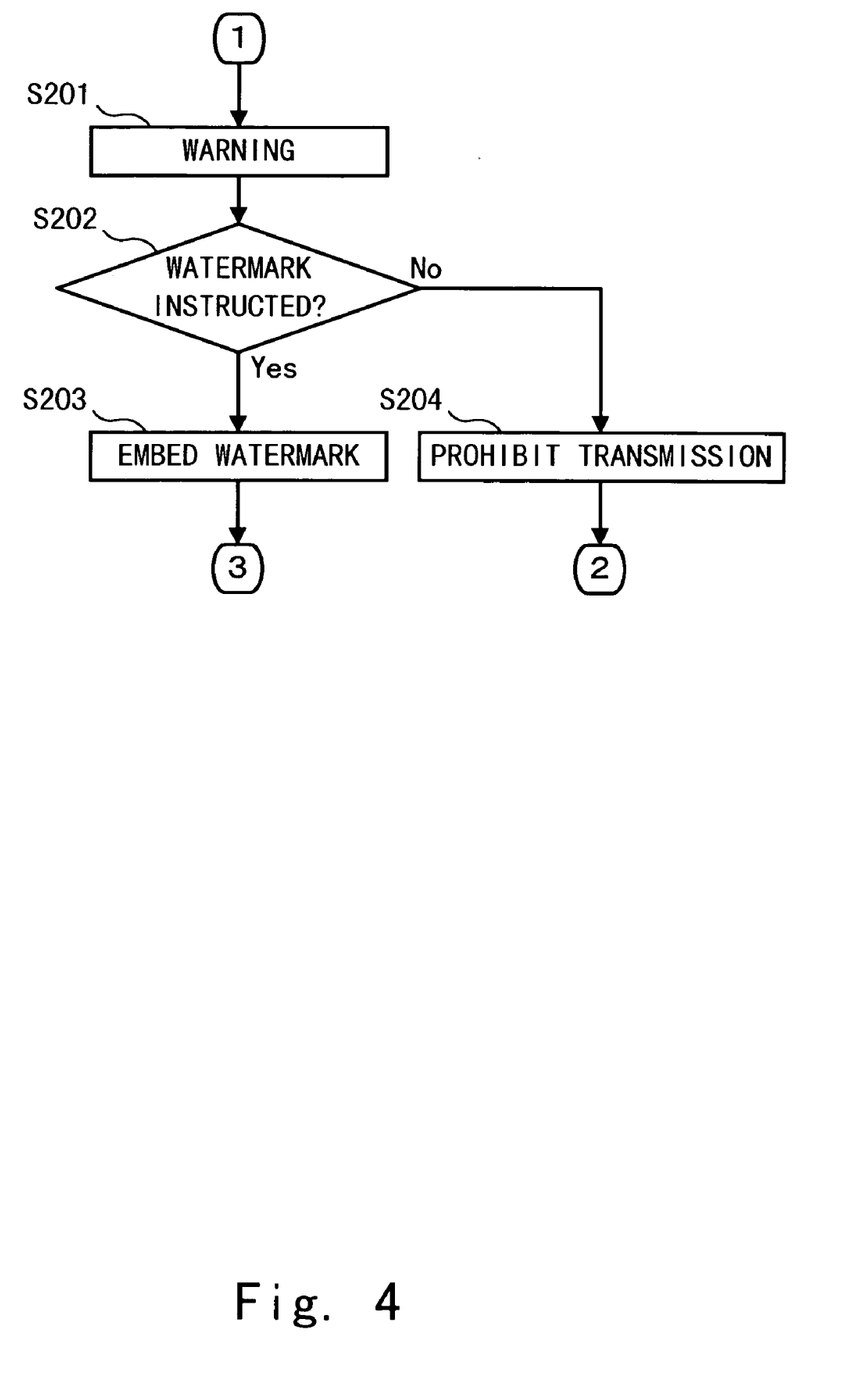
FIG. 4 is a flowchart illustrating the control for transmitting image data in accordance with the first embodiment of the present invention.
Figure 5:
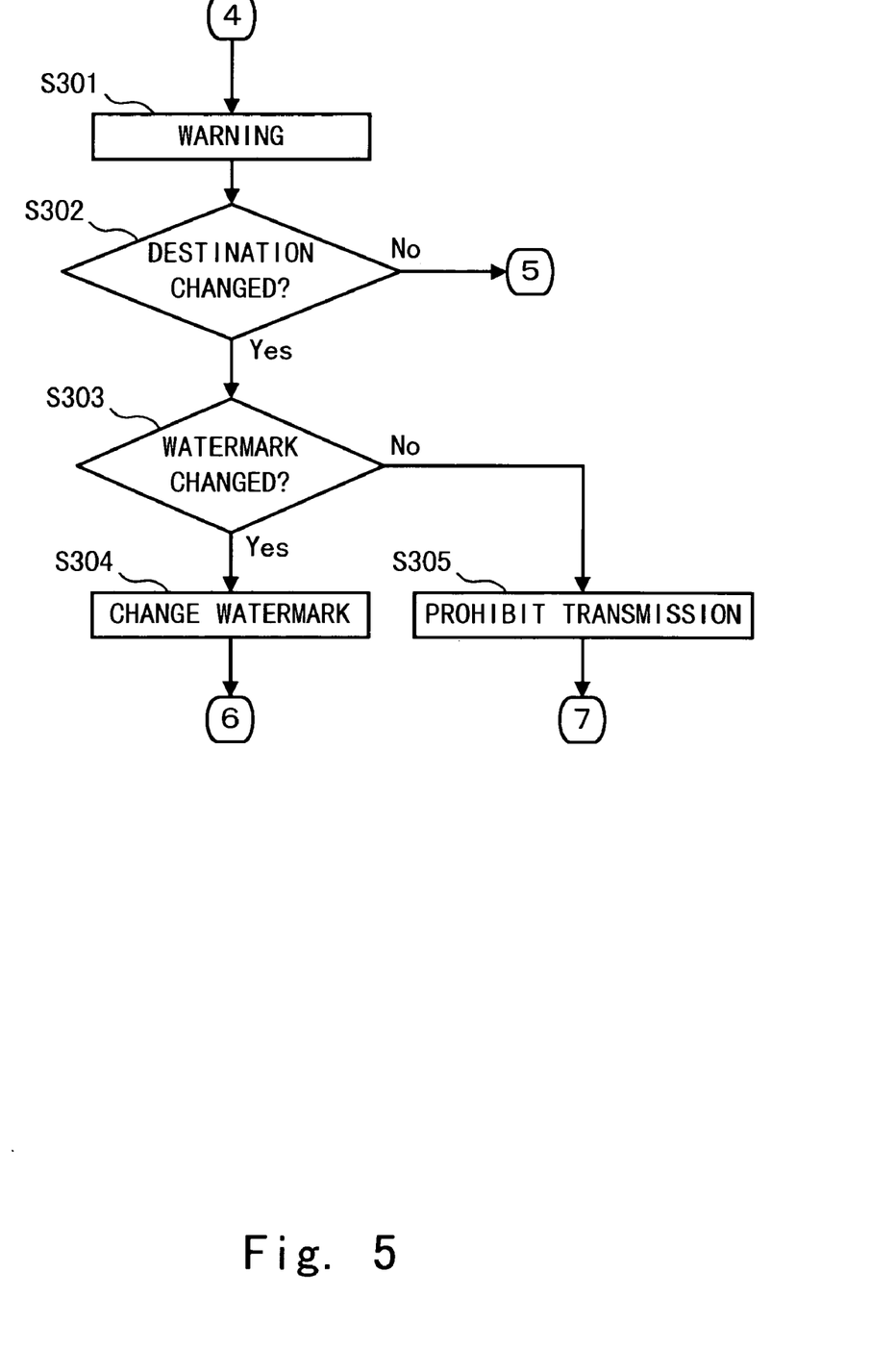
FIG. 5 is a flowchart illustrating the control for transmitting image data in accordance with the first embodiment of the present invention.

FIGS. 3 through 5 are flowcharts illustrating control performed during transmitting the image data. Referring to FIGS. 3 through 5, the process starts when the digital camera is set so that the image data is transmitted to a destination. Referring to FIG. 3, in step S101, it is determined whether or not the destination is selected. If the destination is selected, then the process advances to step S102. If the destination is not selected, then the process turns back to step S101 and performs the operation of step S101 again. In step S102, it is determined whether or not the electronic watermark data should be embedded into the image data for the selected destination.

When the destination is a company such as a publisher or a newspaper company, the electronic watermark data should be embedded in order to protect copyright. When the destination is a destination such as photographer's home, the electronic watermark data need not be embedded. Information on whether the electronic watermark data should be embedded is stored in memory 7 in advance. If the electronic watermark data should be embedded for the destination, then the process advances to step S103. If not, the process advances to step S105.

In step S103, it is determined whether or not the electronic watermark data has been embedded into the image data. If the electronic watermark data has been embedded, then the process advances to step S104. If not, the process advances to step S201 in FIG. 4. The operation of step S201 will be described later. In step S104, it is determined whether or not the selected destination corresponds to the electronic watermark data embedded in the image data. If the selected destination corresponds to the electronic watermark data embedded in image data, then the process advances to step S105. If not, the process advances to step S301 in FIG. 5. The operation of step S301 will be described later. In step S105, the image data is transmitted to the selected destination.

In step S201 in FIG. 4, the digital camera warns a user that copyright may not be protected because the electronic watermark data is not embedded in the image data, and the digital camera asks him whether to embed the electronic watermark data. In step S202, it is determine whether or not a command to embed the electronic watermark is set. If the command is set, then the process advances to step S203. If not, the process advances to step S204, and prevents the image data from being transmitted.

In step S301 in FIG. 5, the digital camera warns the user that the electronic watermark data embedded in the image data does not correspond to the destination, and asks him whether to change the destination or the electronic watermark data. In step S302, it is determined whether or not a command to change the destination is set. If the command to change the destination is set, the process turns back to step S101. If not, the process advances to step S303.

The Second Embodiment

The second embodiment of the digital camera according to the present invention will be explained. The digital camera creates a folder on each destination and a folder on each photographer in advance, and embeds the electronic watermark corresponding to the folder into the image data at the time when the image data is stored into the folder, thereby preventing an improper watermark from being embedded into the image data. And the digital camera also can prevent the user from forgetting to embed the electronic watermark data.

Figure 6:
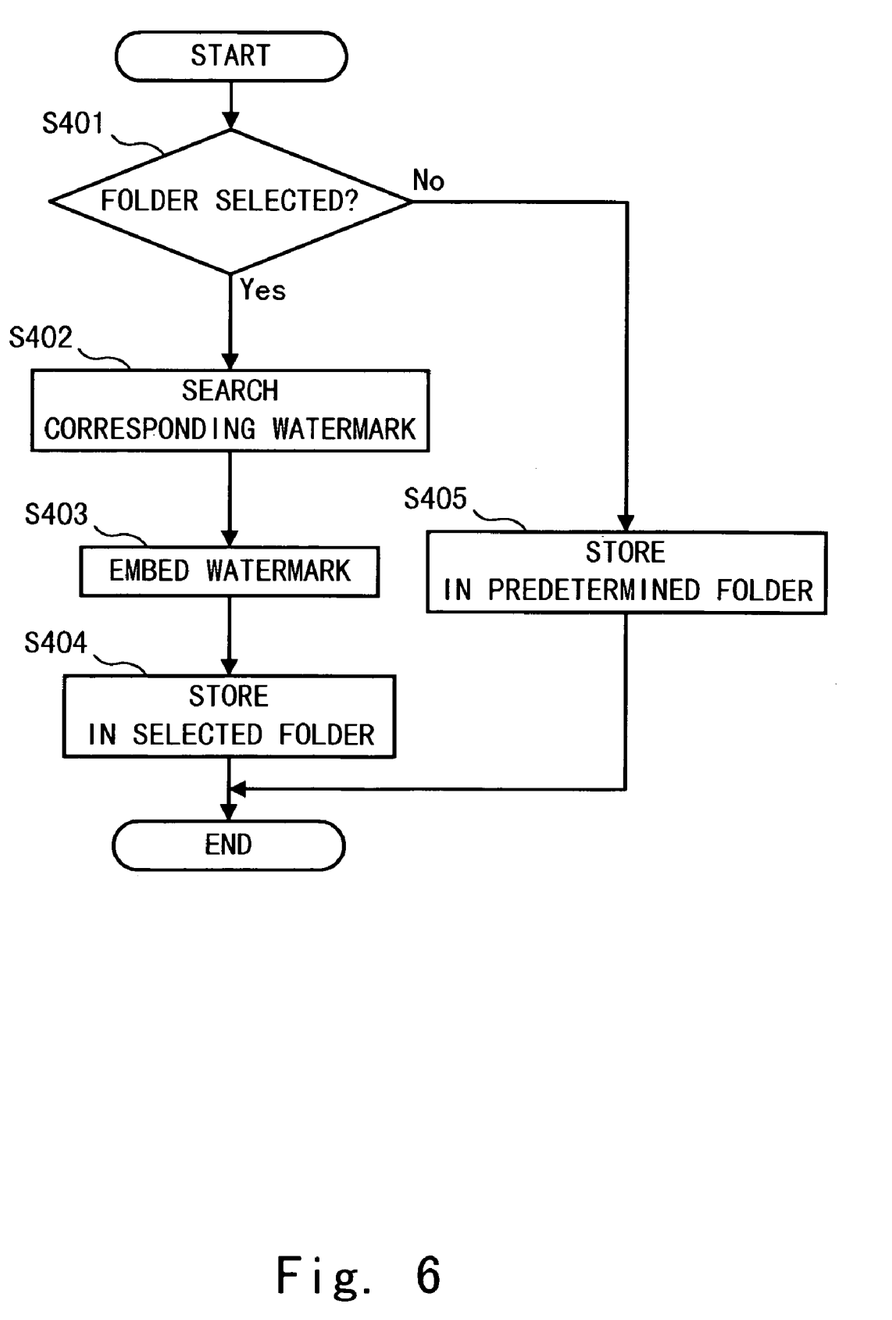
FIG. 6 is a flowchart illustrating the control performed in the digital camera in accordance with the second embodiment of the present invention.

Referring to FIG. 6, a flowchart starts when the image data is formed after a picture is taken. In step S401, it is determined whether or not a folder for storing image data has been selected. When a plurality of photographers share one camera, the folders on photographers are used. If the folder has been selected, then the process advances to step S402. If not, then the process advances to step S405, and the image data without the embedded electronic watermark data is stored in a predetermined folder. In step S402, the electronic watermark data corresponding to the selected folder is searched through information stored in memory 207. In step S403, the electronic watermark data is embedded into the image data. In step S404, the image data is stored in the selected folder.

The Third Embodiment

The third embodiment of the digital camera according to the present invention will be explained. When a destination to which the image data is transmitted is designated, the digital camera embeds the electronic watermark data of the destination into the image data and stores the image data into a folder corresponding to the destination.

Figure 7:
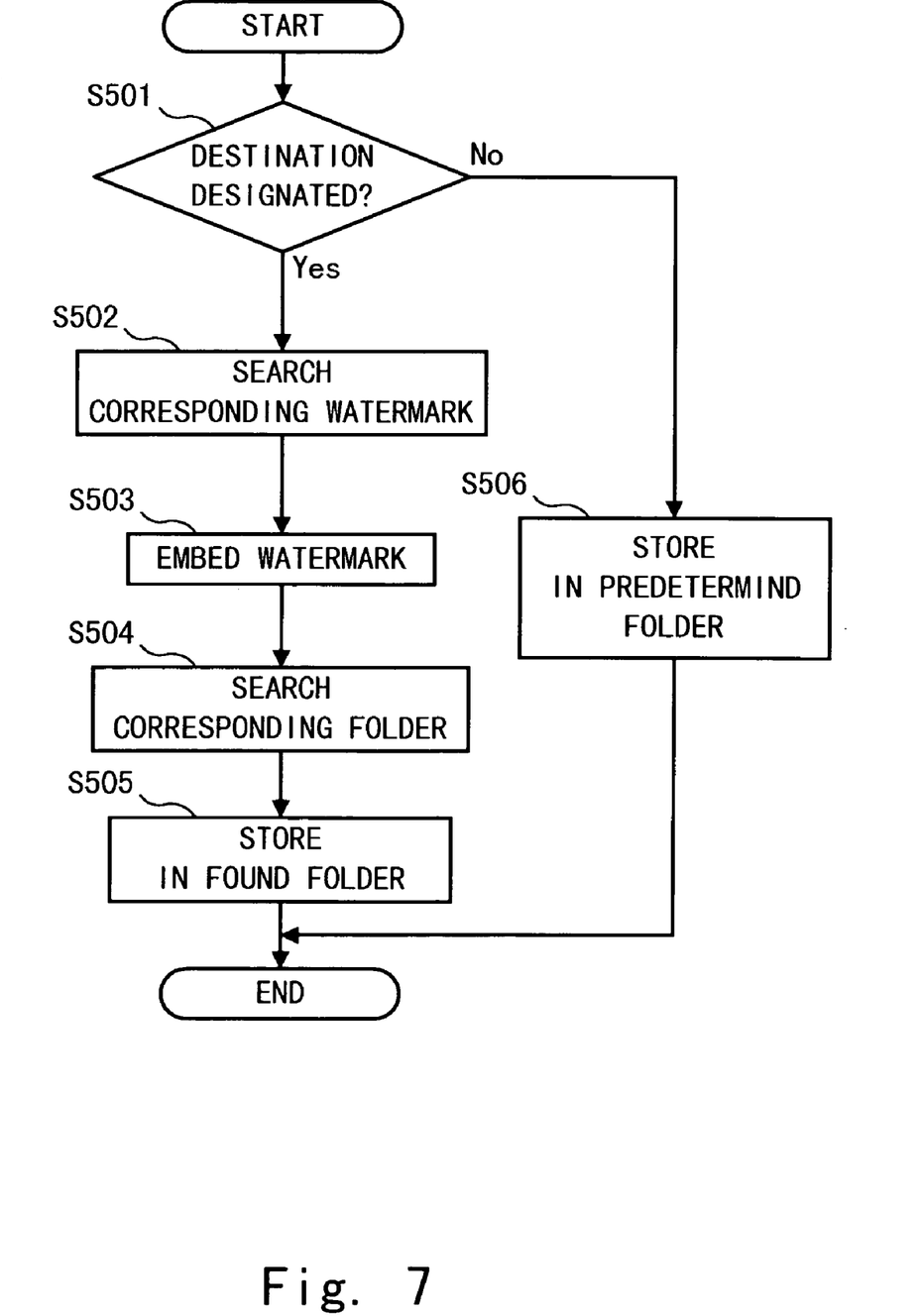
FIG. 7 is a flowchart illustrating the control performed in the digital camera in accordance with the third embodiment of the present invention.

Referring to FIG. 7, a flowchart starts when the image data is formed after a picture is taken. In step S501, it is determined whether or not a destination has been designated. If the destination has been designated, then the process advances to step S502. If not, the process advances to step S506 and the image data without the embedded electronic watermark data is stored into a predetermined folder. In step S502, the electronic watermark data corresponding to the designated destination is searched. In step S503, the electronic watermark data is embedded into the image data. In step S504, the folder corresponding to the destination is searched. In step S505, the found folder stores the image data.

The Fourth Embodiment

The fourth embodiment of the digital camera according to the present invention will be explained. The digital camera creates a folder on each electronic watermark, a folder on each authentication key and a folder on each durability, and stores the image data into the corresponding folder. Since each image data is classified and stored into the corresponding folder, it is possible to avoid transmitting the image data to an improper destination. And it is easy to search for the image data having the same electronic watermark data.

Figure 8:
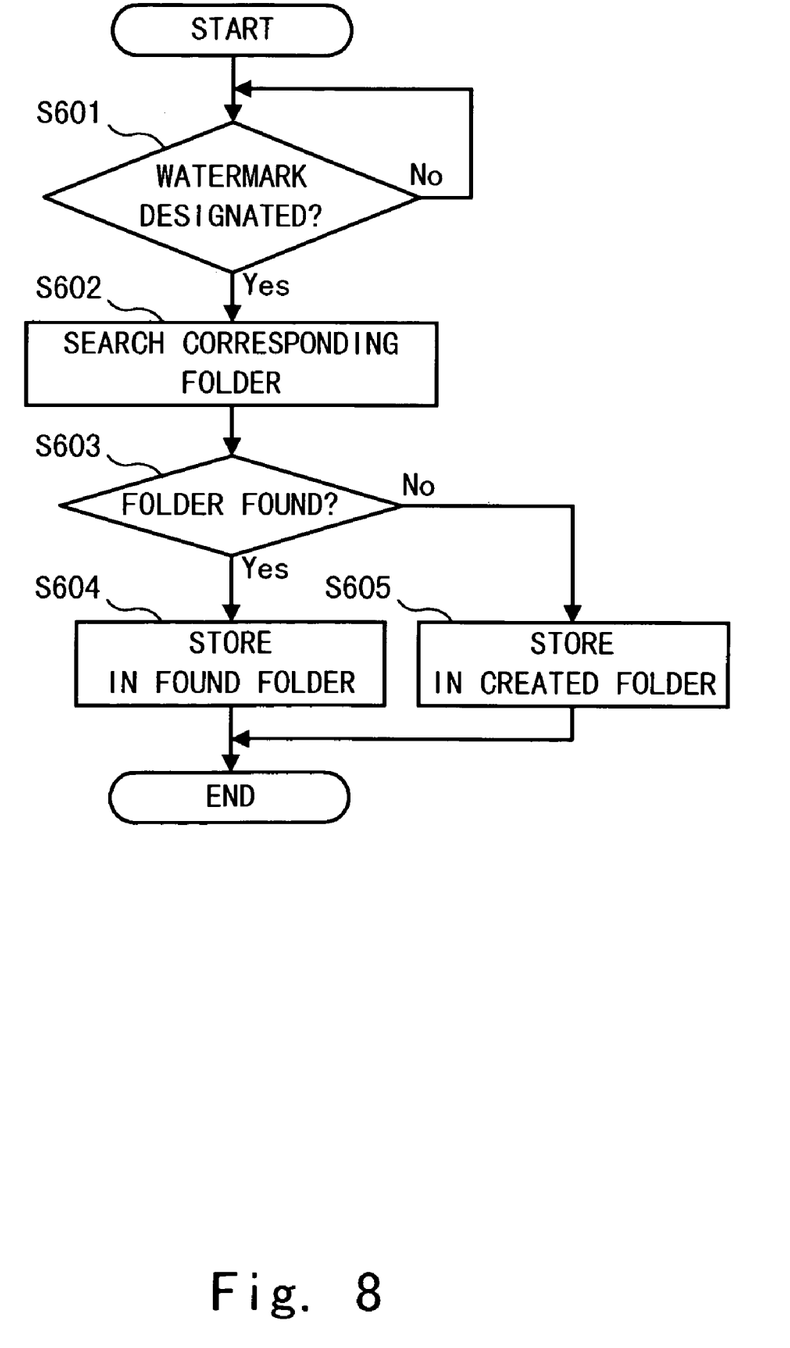
FIG. 8 is a flowchart illustrating the control performed in the digital camera in accordance with the fourth embodiment of the present invention.

Referring to FIG. 8, a flowchart starts when the image data is formed after a picture is taken. In step S601, it is determined whether or not the electronic watermark has been selected and whether or not the authentication key has been selected. If both of the electronic watermark and authentication key have been selected, then the process advances to step S602. If not, then the process repeats step S601. In step S602, the folder corresponding to the electronic watermark is searched. In step S603, it is determined whether or not the corresponding folder searched in step S602 is present. If the corresponding folder is present, then the process advances to step S604. If not, then the process advances to step S605. In step S604, the electronic watermark is embedded into the image data and the image data is stored into the found folder. In step S605, a new folder is created and the electronic watermark is embedded into the image data and the image data is stored into the created folder.

The Fifth Embodiment

The fifth embodiment of the digital camera according to the present invention will be explained.

Pressing menu button 103 enables display 101 to display a menu screen that presents description of settings for controlling various shooting manners and image processing. In the present embodiment, a setting of an electronic watermark embedding mode and a setting of an image data storing mode are performed as follows.

The setting of an electronic watermark embedding mode includes a mode for storing only the image data having the embedded electronic watermark data, a mode for storing only the image data having no embedded electronic watermark data, and a mode for storing both of the image data with and without embedded electronic watermark data. These modes are selectable.

When the setting is not established in the digital camera, the image data without the embedded electronic watermark data is automatically stored in the memory. At the same time the digital camera is set automatically so as that the image data with the embedded electronic watermark data is stored into the memory. After that, the digital camera stores the embedded electronic watermark data. In this case, the image data with the embedded electronic watermark data is stored into the memory at a higher compression rate, i.e., at lower resolution than that of the image data without the embedded electronic watermark data. This storage of the image data allows the image data to occupy smaller space of the memory and enables the digital camera to store much more image data in the memory. However, if the photographer doesn't desire to compress the image data, he may choose to store the image data at the same compression rate and resolution as those of the image data without the embedded electronic watermark data.

In addition, durability of the embedded electronic watermark data can be set, as described previously. If the durability is set at high level, the quality of the image data, in which the electronic watermark data is embedded, is deteriorated. Setting the durability is dependent on the purpose of using the image data. That is, the durability intended for protecting copyright is different from the durability intended for preventing tampering. If the durability has not been set for the digital camera, the prevention of tampering should be preceded, with the durability being set at low level. Protecting copyright can be set at a later time because even the durability setting at a later time will bring the effect of protecting copyright. On the contrary, in preventing tampering, if the setting is not performed at the beginning, tampering could be conducted before setting the durability.

The setting of the image data storing mode includes a raw data storing mode for storing raw image data that is hardly processed from a signal generated by an imaging device, a non-compression storing mode for storing uncompressed image data that is processed from a signal generated by the imaging device in a predetermined manner, and a JPEG compression storing mode for storing JPEG compressed image data that is compressed by JPEG compression after processed in a predetermined manner. These image data storing modes are selectable.

The JPEG compression mode allows the selection of a compression rate and the selection of resolution (or the image size) of the image data. As described later, the compression rate of the image data with the embedded electronic watermark data is made equivalent to or higher than that of the image data without the embedded electronic watermark data, and the resolution of the image data with the embedded electronic watermark data is made equivalent to or lower than that of the image data without the embedded electronic watermark data. However, in the case where the compression rate and the resolution have been set for the image data with the embedded electronic watermark data, the image data is stored according to the set compression rate and the set resolution.

Figure 9:
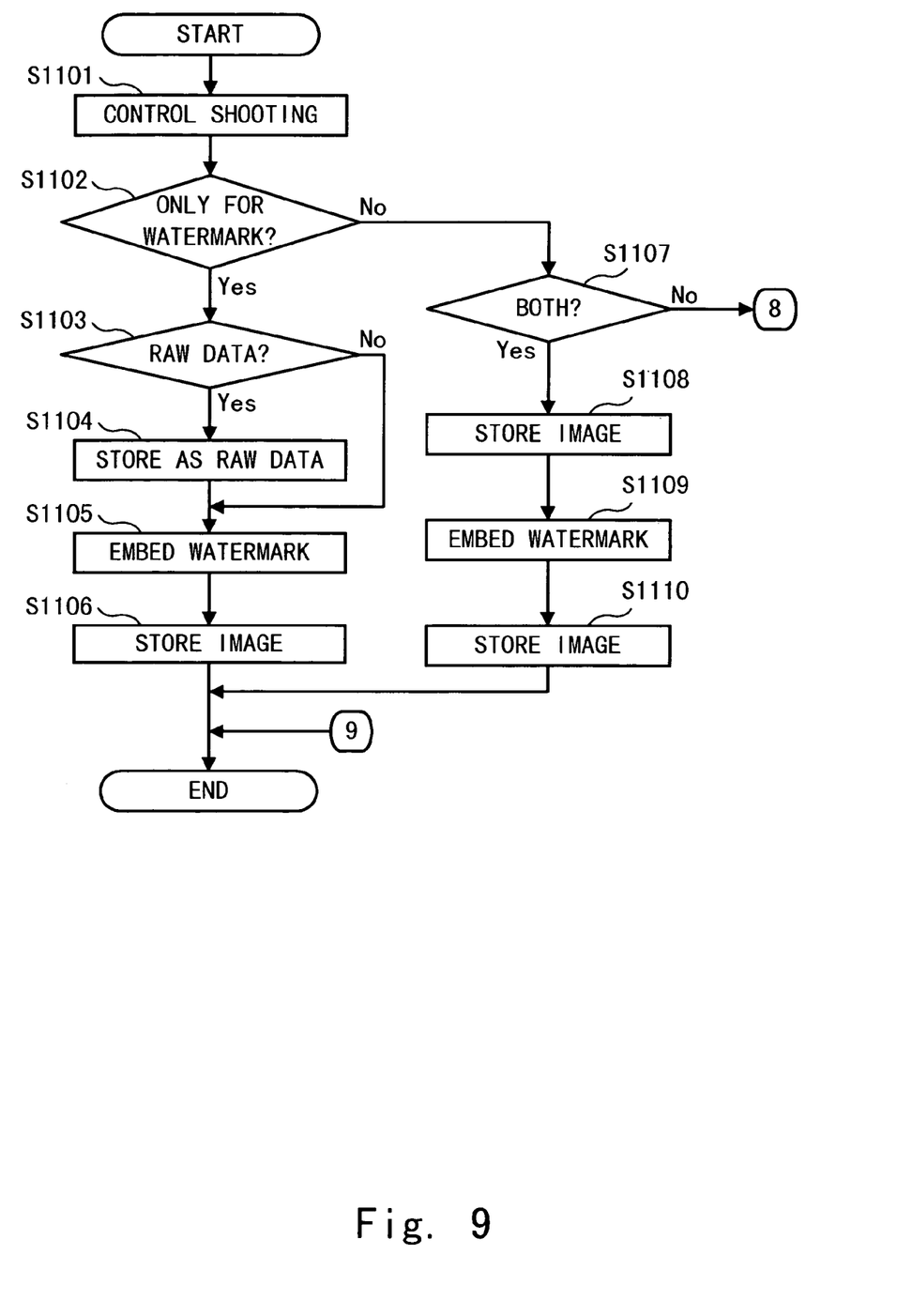
FIGS. 9, 10 are flowcharts illustrating the control of photographing and storing image data of the digital camera in accordance with the fifth embodiment of the present invention.
Figure 10:
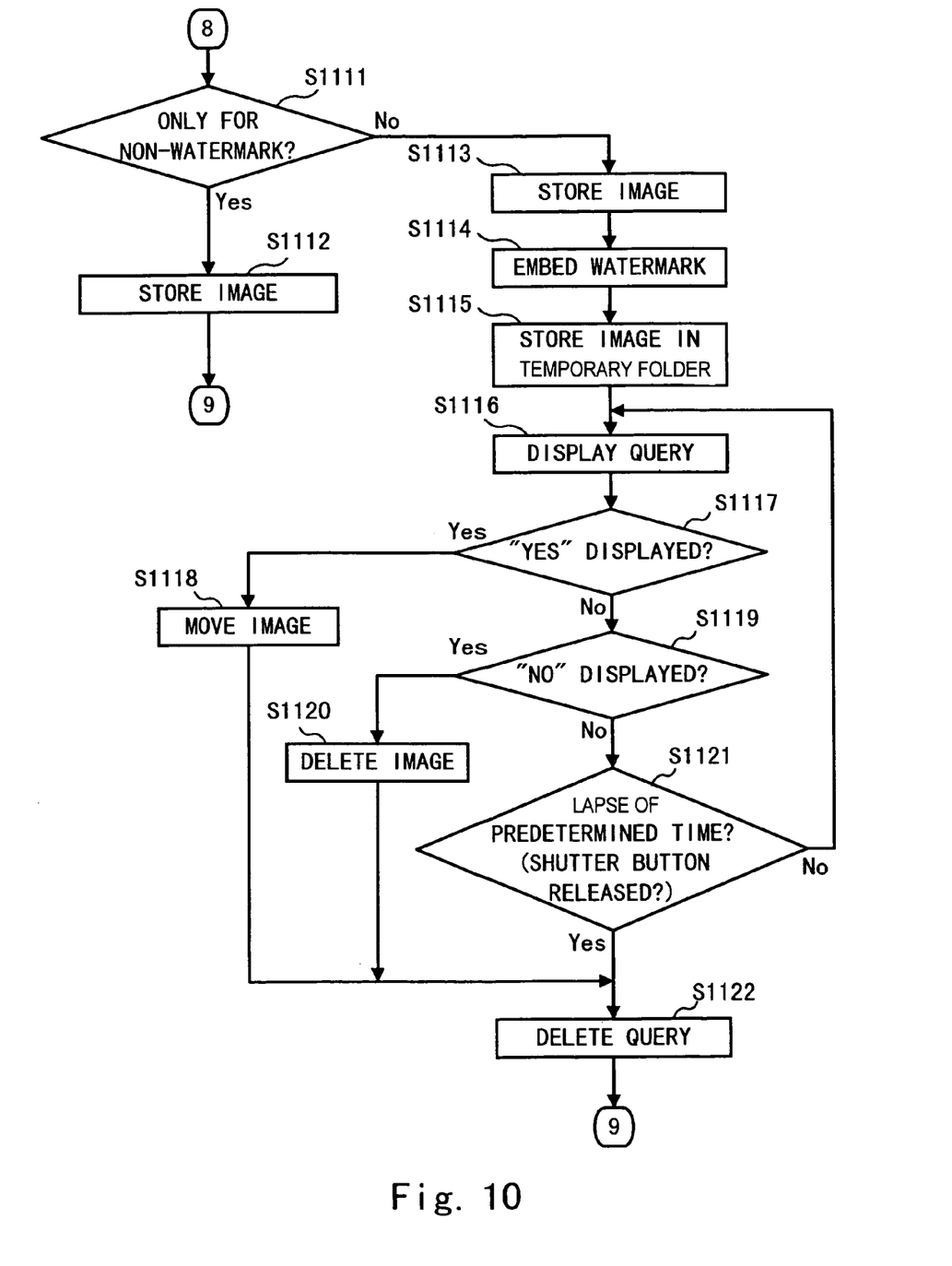

FIGS. 9, 10 are flowcharts illustrating the process between taking a picture and storing the image data. CPU 201 implements the process in accordance with the fifth embodiment of the present invention. Referring to FIG. 9, a flowcharts starts with the press of shutter-release button 102.

In step S1101, shooting is controlled according to set imaging conditions. In step S1102, it is determined whether or not the digital camera has been set so as to store only the image data with the embedded electronic watermark data. If the digital camera has been set so as to store only the image data with the embedded electronic watermark data, then the process advances to step S1103. If not, then the process advances to step S1107. In step S1103, it is determined whether or not the raw data storing mode has been selected. If the raw data storing mode has been selected, then process advances to step S1104. If not, the process advances to step S1105.

In step S1104, the image data, in the form of the raw data, is stored into a predetermined folder in the memory. In step S1105, the electronic watermark data is embedded into the image data with set durability. If the durability has not been set, the electronic watermark data is embedded with low durability. In step S1106, according to the selected image data storing mode, the image data with the embedded electronic watermark data is processed with JPEG compression or non-compression and stored into a predetermined folder in the memory. If the image data is the raw data, high quality and uncompressed image data with the embedded electronic watermark data is stored into a raw data folder in the memory. In this case, a file name for the image data is assigned as follows; if the image data of a subject, which is stored as the raw data, is named "DSC001", the image data of the same subject, which has the embedded electronic watermark data, is named "DSC001WM". Thus, names relating to the two image data files are correlated each other, and the two image data files are stored in the same folder.

In the case where the digital camera has not been set so as to store only the image data with the embedded electronic watermark data in step S1102, the process advances to step S1107 as described previously. In step S1107, it is determined whether or not the digital camera has been set so as to store both of the image data with and without the embedded electronic watermark data. If the digital camera has been set so as to store both of the image data with and without the embedded electronic watermark data, then the process advances to step S1108. If not, then the process advances to step S111. In step S1108, according to the selected image data storing mode, JPEG-compression image data, non-compression image data, or raw-data image data is stored into predetermined folders. In step S1109, the electronic watermark data is embedded into the image data with set durability. If the setting of the durability has not been made, the electronic watermark data is embedded with low durability.

In step S1110, according to the setting of the image data storing mode, the JPEG-compression or the non-compression image data with the embedded electronic watermark data is stored into a folder for storing the image data with the embedded electronic watermark data. If the raw data storing mode has been selected, the high quality and uncompressed image data is stored into the memory. Thus, the image data with and without the embedded electronic watermark data are stored in different folders in the memory respectively. It is, therefore, convenient to transmit only the image data with the electronic watermark data to other place outside. Each image data file's name is correlated each other as well as in step S1106.

In the case where the digital camera has not been set so as to store both of the image data with and without the embedded electronic watermark data in step S1107, it is determined whether or not the digital camera has been set so as to store only the image data without the embedded electronic watermark data in step S112. If the digital camera has been set so as to store only the image data without the embedded electronic watermark data, then the process advances to step S1112. If not, then the process advances to step S1113. In step S1112, according to the setting of the image data storing mode, the JPEG-compression, the non-compression, or the raw-data image data without the embedded electronic watermark data is stored into the memory.

In step S1111, if the digital camera has not been set so as to store only the image data without the embedded electronic watermark data, it means that the digital camera is not set at all with respect to embedding the electronic watermark data. This situation, for example, could occur at the time such as when the digital camera is set fully automatic, or at the time when the photographer has no time for setting the digital camera because a shutter chance has come suddenly. However, even the image data taken in such a situation could be tampered or copied, it is, therefore, necessary to perform prevention of tampering and protection of copyright. In step S1113, according to the setting of the image data storing mode, the JPEG-compression, the non-compression, or the raw-data image data is stored into the memory.

In step S1114, the electronic watermark data is embedded into the image data with low durability. In step S1115, the image data with the embedded electronic watermark data is JPEG-compressed and stored into the memory. In step S1115, not likely step S1110, the setting is not used, and the image data is JPEG-compressed at a high compression rate, i.e., at low resolution, and is stored into the memory. The image data is also stored in a temporary folder for temporary retention.

As described above, the image data with the embedded electronic watermark data is JPEG-compressed at a predetermined compression rate because it is a waste of memory space if the photographer stores the image data with the embedded electronic watermark data, which could be unnecessary, into the memory without data compression. However, if it is necessary, the image data may be stored into the memory according to the setting of the image data storing mode as well as in step S1110.

In step S1116, the digital camera displays an query whether or not to store the image data with the embedded electronic watermark data. In step S1117, it is determined whether or not "YES" is displayed on the LCD display according to an answer to the query. If "YES" is displayed on the LCD display, then the process advances to step S1118. If not, then the process advances to step S1119.

In step S1118, the image data with the embedded electronic watermark data, which is stored in the temporary file in step S1115, is transferred to a predetermined folder in order to be stored. In step S1119, it is determined whether or not "NO" is displayed on the LCD display. If "NO" is displayed on the LCD display, then the process advances to step S1120. If not, the process advances to step S1121.

In step S1120, the image data with the embedded electronic watermark, which is stored in the temporary folder in step S1115, is deleted. In step S1121, it is determined whether or not a predetermined period has been passed. Also in step S1121 it is determined whether or not the shutter-release button has been pressed. If the predetermined period has been passed or the shutter-release button has been pressed, then the process advances to step S1122. If the predetermined period has been not passed nor the shutter-release button has been pressed, then the process returns to step S1116. In step S1122, the indication displayed in step S1116 is deleted. And the present flowchart ends.

In accordance with the fifth embodiment of the present invention, the digital camera can store both of the image data with and without the embedded electronic watermark data into the memory, so that the digital camera can store the image data without deterioration of image quality and can have the effect on protection of copyright and prevention of tampering.

When the image data with the embedded electronic watermark data is used for verifying whether the image data has been tampered or not by comparing unused image data with used image data, the quality of the image data with the embedded electronic watermark data is allowed to be lower than the quality of the original image data.

Furthermore, even if the image data storing mode is set in the raw data storing mode, the digital camera can obtain the image data with the embedded electronic watermark data by using the embedding circuit and the embedding program for the electronic watermark. And, even if the image data is set in one of the image data storing modes other than the raw data storing mode, which do not allow the digital camera to embed the electronic watermark, the digital camera can have the same effect as that in the raw data storing mode.

Furthermore, when the setting on whether or not the electronic watermark data is embedded in the image data is not made, both of the image data with and without the embedded electronic watermark data are stored into the memory. This storage of both image data enables the photographer to surely obtain the image data with the embedded electronic watermark data, even if an abrupt shutter chance occurs. Therefore, by checking the image data with the embedded electronic watermark data, It is possible to verify whether or not the image data has been tampered. In this case, the electronic watermark is embedded into the image data with low durability, in advance. As to the protection of copyright, even if the electronic watermark is embedded at a later time, it is possible to protect copyright, as described previously.

Furthermore, by storing each of the image data with and without the embedded electronic watermark data into a different folder, it is easy to individually handle each of the image data with and without the embedded electronic watermark data; for example, it is possible to prevent image data, of which copyright is not protected yet, from being transmitted outside carelessly. In the case of the digital camera having plural card slots, it is possible to store the image data into different memory cards instead of storing the image data into different folders.

The Sixth Embodiment

In the fifth embodiment, when the digital camera stores the image data according to the setting indicated on the menu, problems and contradictions have arisen. However, these problems and contradictions have been resolved by implementing the process shown in FIGS. 9, 10. In the sixth embodiment, by limiting setting conditions, the problems and contradictions are resolved referring to FIG. 11.

Figure 11:
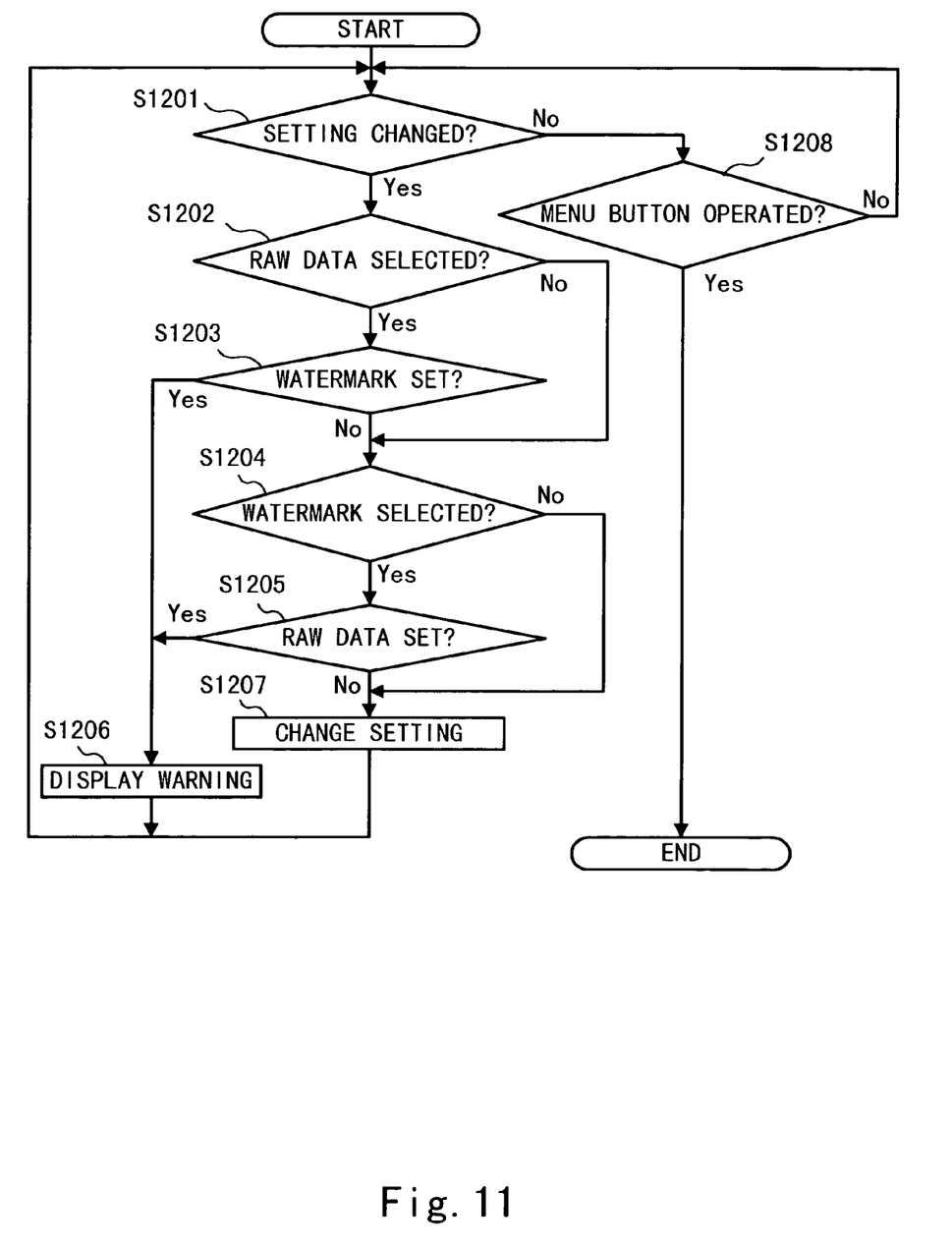
FIG. 11 is a flowchart illustrating the control of settings that is performed in accordance with the sixth embodiment of the present invention.

FIG. 11 is a flowchart illustrating control of settings that is implemented by CPU 201 in accordance with the sixth embodiment of the present invention. Since an external view and a functional block diagram of the digital camera of the sixth embodiment is the same as those of the fifth embodiment, explanation is omitted. The present flowchart starts with the press of menu button 103.

In step S1201, it is determined whether or not the selection for changing the setting has been made. If the selection for changing the setting has been made, then the process advances to step S1202. If not, then the process advances to step S1208. In step S1202, it is determined whether or not the raw image data storing mode has been selected. If the raw image data storing mode has been selected, then the process advances to step S1203. If not, then the process advances to step S1204.

In step S1203, it is determined whether or not the setting has been made so as to embed electronic watermark data. If the setting has been made so as to embed electronic watermark data, then the process advances to step S1206. If not, then the process advances to step S1204. In step S1204, it is determined whether or not selection has been made so as to embed electronic watermark data. If the selection has been made so as to embed electronic watermark data, then the process advances to step S1205. If not, then the process advances to step S1207.

In step S1205, it is determined whether or not the raw data storing mode is selected. If the raw data storing mode is selected, then the process advances to the step S1206. If not, then the process advances to step S1207. In step S1206, since the selection made in step S1201 is to select the raw data storing mode and to select the electronic watermark data to be embedded into the image data simultaneously, an alert indicating that the raw data storing mode and the embedding of the electronic watermark data cannot be selected simultaneously is displayed on LCD display 101. And the process turns back to step S1201.

In step S1207, since the selection made in step S1201 is not to select the raw data storing mode and the embedding of the electronic watermark data simultaneously, the setting is changed according to selected operation. In step S1208, it is determined whether or not menu button 103 has been operated. If menu button 103 has been operated, then the present flowchart ends. If not, then the process turns back to step S1201.

In accordance with the sixth embodiment of the present invention, since the embedding circuit cannot simultaneously select the raw data storing mode, in which an electronic watermark cannot be embedded, and the embedding of the electronic watermark, the contradictions and problems in storing settings do not arise.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A digital camera comprising:
   an imaging device that forms a digital image data of an object;
   a memory that stores a plurality of programs each to embed a watermark on the digital image data;
   a program selector that selects one of the plurality of programs;
   an embedding circuit that embeds the watermark on the image data according to the program selected by the program selector; and
   a transmitter that transmits the digital image data to a place remote from the camera and a controller that inhibits the transmitter from transmitting the digital image data to a place where the watermark caused by the selected program is not available.

2. A digital camera comprising:
   an imaging device that forms a digital image data of an object;
   a memory that stores a plurality of programs each to embed a watermark on the digital image data;
   a program selector that selects one of the plurality of programs;
   an embedding circuit that embeds the watermark on the image data according to the program selected by the program selector; and
   a transmitter that transmits the digital image data to a place remote from the camera and a controller that replaces the selection of the program if the digital image data is to be transmitted to a place where the watermark caused by the selected program is not available.

3. A digital camera comprising:
   an imaging device that forms a digital image data of an object;
   a memory that stores a plurality of programs each to embed a watermark on the digital image data;
   a program selector that selects one of the plurality of programs;
   an embedding circuit that embeds the watermark on the image data according to the program selected by the program selector; and
   a transmitter that transmits the digital image data to a place remote from the camera and a controller that gives a warning if the digital image data is to be transmitted to a place where the watermark caused by the selected program is not available.

4. A digital camera comprising:
   an imaging device that forms a digital image data of an object;
   an embedding circuit that embeds a watermark on the digital image data;
   a transmitter that transmits the digital image data to a place remote from the camera; and
   a controller that inhibits the transmitter from transmitting the digital image data on which the watermark is failed to be embedded.

5. The digital camera according to claim 4, further comprising a place selector that selects the place to which the digital image data is transmitted, wherein the controller determines whether or not to actually inhibit the transmission in dependence on the selection of the place by the place selector.

6. A digital camera comprising:
   an imaging device that forms a digital image data of an object;
   an embedding circuit that embeds the watermark on the digital image data; and
   a controller that controls the embedding circuit to surely embed the watermark on the digital image data on which the watermark is failed to be embedded.

7. The digital camera according to claim 6, further comprising a transmitter that transmits the digital image data to a place remote from the camera and a place selector that selects the place, wherein the controller determines whether or not to actually control the embedding circuit to embed the watermark in dependence on the selection of the place by the place selector.

8. A digital camera comprising:
- an imaging device that forms a digital image data of an object;
- an embedding circuit that embeds the watermark on the digital image data; and
- a controller that gives a warning if the watermark is failed to be embedded.

9. The digital camera according to claim 8, further comprising a transmitter that transmits the digital image data to a place remote from the camera and a place selector that selects the place, wherein the controller determines whether or not to actually give the warning in dependence on the selection of the place by the place selector.

10. A digital camera comprising:

an imaging device that forms a digital image data of an object;

an embedding circuit that embeds a watermark on the digital image data;

a setting circuit that sets whether or not to have the embedding circuit embed the watermark; and a controller that forcibly controls the embedding circuit to embed the watermark if the setting by the setting circuit is failed.

* * * * *